(12) United States Patent
Mapes

(10) Patent No.: US 6,873,838 B2
(45) Date of Patent: Mar. 29, 2005

(54) SUPERREGENERATIVE OSCILLATOR RF RECEIVER WITH DIFFERENTIAL OUTPUT

(75) Inventor: Gordon Mapes, Troy, MI (US)

(73) Assignee: Robert Bosch Corporation, Broadview, IL (US)

( * ) Notice: Subject to any disclaimer, the term of this patent is extended or adjusted under 35 U.S.C. 154(b) by 630 days.

(21) Appl. No.: 09/851,265

(22) Filed: May 8, 2001

(65) Prior Publication Data

US 2002/0168957 A1 Nov. 14, 2002

(51) Int. Cl.$^7$ ................................................ H04B 1/16
(52) U.S. Cl. .................... 455/336; 455/334; 455/337; 455/343.1; 455/338
(58) Field of Search ............................ 455/334, 336, 455/337, 338, 343.1, 205, 214, 215

(56) References Cited

U.S. PATENT DOCUMENTS

| | | | |
|---|---|---|---|
| 3,746,999 A | * | 7/1973 | Freen ........................... 455/336 |
| 3,805,184 A | | 4/1974 | Visioli, Jr. et al. |
| 3,857,110 A | | 12/1974 | Grebene |
| 3,869,679 A | | 3/1975 | Grebene |
| 4,081,766 A | | 3/1978 | Gay |
| 4,398,283 A | * | 8/1983 | Pottier ........................ 370/281 |
| 5,136,263 A | | 8/1992 | Lane |
| 5,479,137 A | | 12/1995 | Harford |
| 5,565,817 A | | 10/1996 | Lakshmikumar |
| 5,630,216 A | * | 5/1997 | McEwan ..................... 455/336 |
| 5,635,880 A | | 6/1997 | Brown |
| 5,714,911 A | | 2/1998 | Gilbert |
| 5,789,990 A | * | 8/1998 | Ash et al. ............... 331/107 A |
| 5,801,593 A | | 9/1998 | Nguyen |
| 5,946,609 A | * | 8/1999 | Morey ........................ 455/336 |
| 6,421,535 B1 | * | 7/2002 | Dickerson et al. .......... 455/338 |
| 6,703,904 B2 | * | 3/2004 | Aikawa et al. ............... 331/56 |

* cited by examiner

*Primary Examiner*—Edward F. Urban
*Assistant Examiner*—Lana Le
(74) *Attorney, Agent, or Firm*—Greer, Burns & Crain, Ltd.

(57) ABSTRACT

A superregenerative oscillator RF receiver having a differential output that has the advantage of providing an improved operating range and increased receiver sensitivity without affecting receiver cost or current requirements. The present invention comprises a receiver that has a superregenerative oscillator from which the demodulated output is taken in differential form. This is achieved by generating collector and emitter output signals, low pass filtering both signals, and then combining them in a difference amplifier. The resulting waveform contains approximately twice the signal content than would be yielded from a singled-ended circuit. The preferred embodiment of present invention can also achieve quench noise cancellation with proper layout and the use of a common mode low pass filter followed by a difference amplifier.

12 Claims, 5 Drawing Sheets

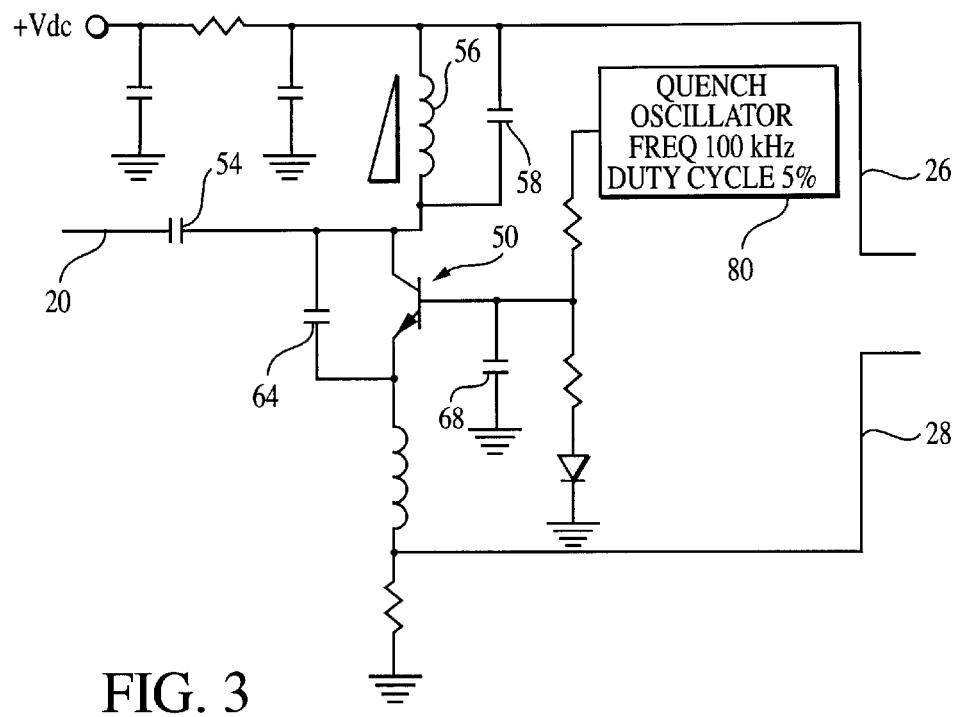
FIG. 3
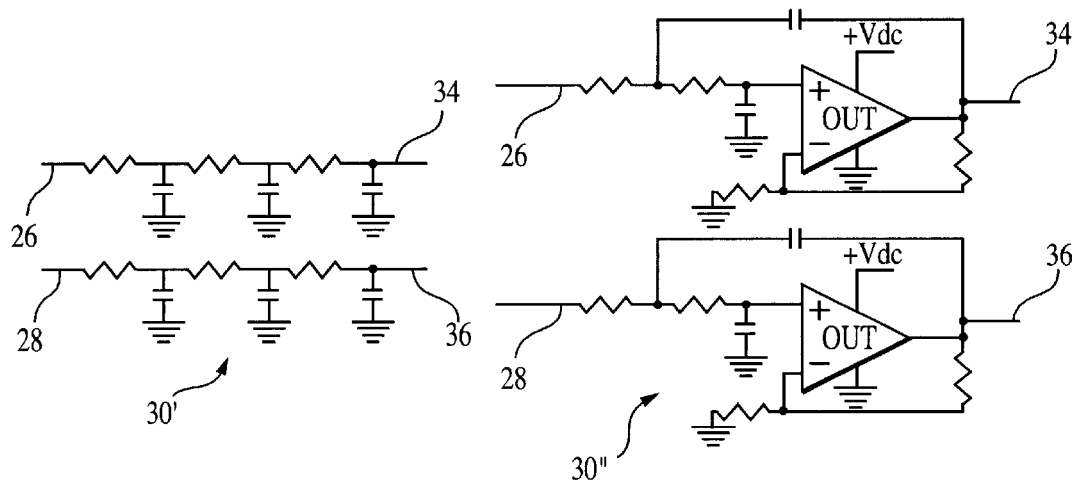
FIG. 4
FIG. 5

SUPERREGENERATIVE OSCILLATOR RF RECEIVER WITH DIFFERENTIAL OUTPUT

BACKGROUND OF THE INVENTION

The present invention generally relates to radio frequency receivers and more particularly to RF receivers that incorporate a superregenerative oscillator in their design.

Superregenerative receivers have been known for some time and are widely used in garage door openers and automotive remote entry systems. These applications require a low cost receiver with simple manufacturing processes, high reliability, and moderate performance specifications. At the present time, typical operating distance specifications for automotive remote entry systems is about 10 meters. In addition, vehicle remote entry receivers must operate when the ignition key is in the OFF position, and therefore must operate with low current, typically about 1 milliamp (mA). The garage door opener and automotive remote entry systems typically use On-Off Keying (OOK) modulation. In this type of modulation, the carrier is present during one logic level, and is not present during the other logic level as is shown in the plot illustrated in FIG. 8.

Superregenerative receivers can offer several advantages over other types of receiver, such as homodyne or superheterodyne technologies. Superregenerative based receivers are low cost, have few components, require low current, and provide acceptable range performance under most conditions. The disadvantages of such receivers can include high emissions over a broad frequency range if the layout is not correct or if it does not include a high reverse isolation preamplifier, poor selectivity if input filtering is inadequate, and a tendency to react to frequencies that are sub-harmonic of the desired operating frequency. For example, a 315 MHz superregenerative oscillator will react to the ⅓ sub-harmonic of 105 MHz. This is problematic in the United States because 315 MHz is an automotive remote entry and garage door frequency and 105.1 MHz is a widely used FM radio frequency. It is therefore necessary to reject sub-harmonic frequencies to assure proper operation and such rejection is achieved with input filtering.

Another problem that is becoming more common in automotive remote entry receivers is inadequate range performance, or equivalently, inadequate sensitivity. This can be caused in any system by sub-optimal antenna placement within the vehicle. In addition, several vehicle manufacturers are increasing their range performance specifications. For this reason, many receiver designs now employ superheterodyne circuits to address this issue. Superheterodyne receivers have significantly higher costs and consume higher currents than do superregenerative solutions. Thus, in addition to higher cost, superheterodyne circuits require current reduction schemes that increase overall circuit complexity.

SUMMARY OF THE INVENTION

This present invention is directed to a superregenerative oscillator RF receiver that has a differential output that has the advantage of providing an improved operating range and increased receiver sensitivity without affecting receiver cost or current requirements. The present invention comprises a receiver that has a super-regenerative oscillator from which the demodulated output is taken in differential form. This is achieved by generating collector and emitter output signals, low pass filtering both signals, and then combining them in a difference amplifier. The resulting waveform contains approximately twice the signal content than would be yielded from a singled-ended circuit. The preferred embodiment of present invention can also achieve quench noise cancellation with proper layout and the use of a common mode low pass filter followed by a difference amplifier.

By combining the collector and emitter output signals of a superregenerative oscillator, the amount of "signal" is doubled, while the "noise" level remains constant. This means that the demodulated signal-to-noise ratio improves by several decibels over the single-ended approach which has been universally applied. This translates into higher receiver sensitivity and greater operating range. In addition, if the circuit that combines the emitter and collector signals maintains the proper phase characteristics, the combination can result in a cancellation of a significant amount of residual quench signal. This lowers the resulting noise level and so further increases the signal-to-noise ratio of the receiver output.

DESCRIPTION OF THE DRAWINGS

FIG. 3 is an electrical schematic diagram of an alternative embodiment of the present invention;

FIG. 4 is another alternative embodiment of the low pass filter of the present invention;

FIG. 5 is yet another alternative embodiment of the low pass filter of the present invention;

DETAILED DESCRIPTION OF THE INVENTION

Figure 1:
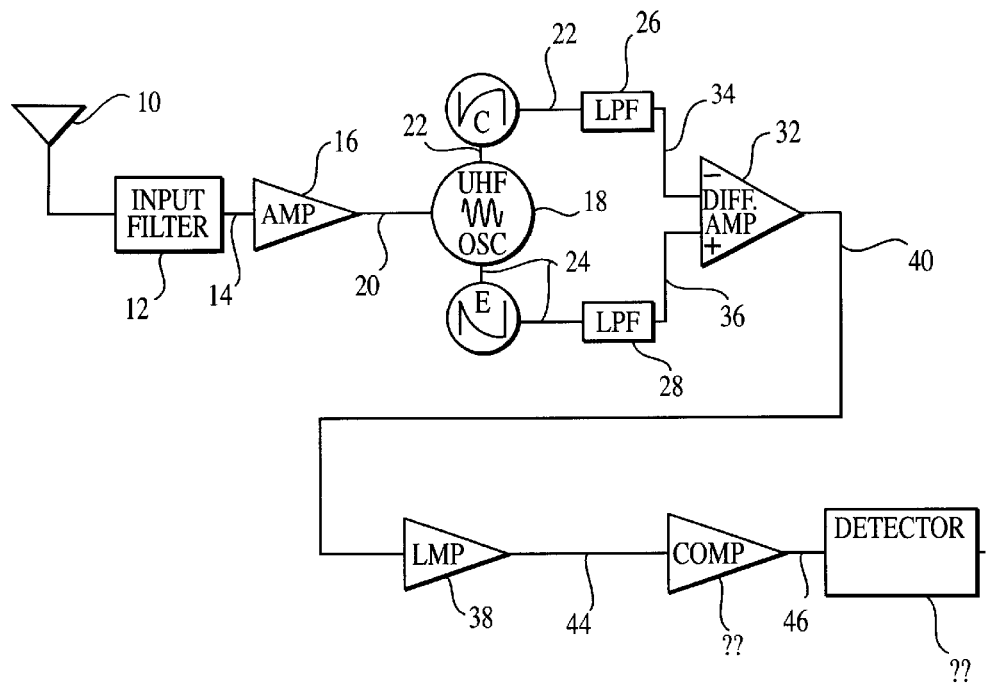
FIG. 1 is a simplified block diagram of the receiver embodying the present invention, shown together with a motor or relay that can be controlled by operation of the receiver.

The present invention is shown in the block diagram of FIG. 1 to include an antenna 10 adapted to detect the output of a transmitter such as a small transmitter that may be part of a driver's automobile key chain, or for a garage door opener or the like. Such transmitters may transmit a coded signal such as that shown in FIG. 8, which illustrates two pulses, each having a duration of approximately 2 milliseconds with an interval of 2 milliseconds of non-transmission. Such on/off keying modulation is typically done in various digital sequences that comprise particular encoded identifications that provide security so that only the owner's sequence will cause his automobile to unlock or his garage door to open. The signal is received by the antenna 10 which transforms energy from the radiated wave of a modulated RF signal to a voltage signal, which is applied to an input filter 12 that attenuates energy that occurs outside the desired frequency pass band for the purpose of excluding signals that would interfere with the encoded signals that are intended to be detected. The output of the input filter is applied on line 14 to an amplifier 16, the output of which is applied to a superregenerative oscillator 18 via line 20. The primary function of the amplifier 16 is to isolate the oscillator 18 from the antenna 10. This is important since the antenna 10 and oscillator 18 are both tuned to the operating frequency. If the amplifier 16 did not isolate them, energy from the oscillator would couple to the antenna and radiate out as unwanted noise, and the receiver would fail to operate. The amplifier 16 also provides gain and stabilizes the impedance presented to the input filter 12 network.

Figure 2:
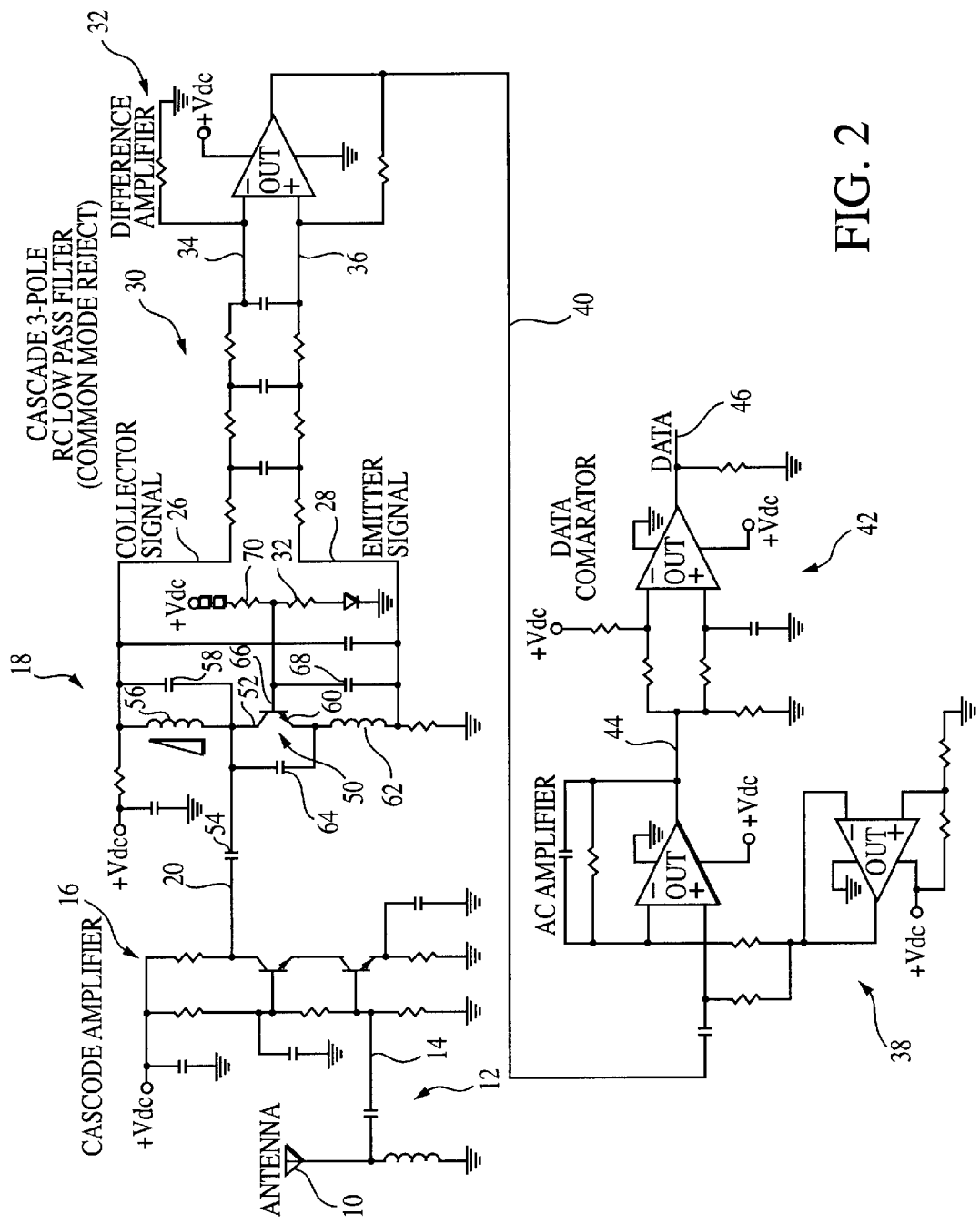
FIG. 2 is an electrical schematic diagram of the preferred embodiment of the present invention.

The oscillator 18 is self-quenching in the preferred embodiment of FIG. 2, but may be connected to a quenching oscillator as will be shown in an alternative embodiment of FIG. 3. The oscillator produces a collector output on line 22 and an emitter output on line 24 (referring to FIG. 1) that are respectively applied to low pass filters 26, 28 and then extended to a difference amplifier 32 via lines 34 and 36. The output of the difference amplifier 32 is applied to an amplifier 38 via line 40 and to a data comparator 42 via line 44. The output of the comparator appears on line 46 which can be applied to a motor control or relay for the purpose of operating an automotive remote entry system or a garage door opener.

The superregenerative oscillator 18 consists of a high frequency oscillator that runs at the system operating frequency. This oscillator is turned ON and OFF (quenched) at a much lower quasi-periodic rate. In the demodulation of an On-Off Keyed (OOK) modulated signal, a superregenerative receiver exploits the nonlinear phenomenon of oscillator startup. All oscillators need a jump-start. Before an oscillator is able to run, it must receive a burst of energy to initiate the positive feedback loop. While noise is usually the source of this start-up energy, the superregenerative oscillator 18 has two potential sources of start-up energy; random noise, and an RF signal at the oscillator's operating frequency. Once kick-off occurs, the oscillator 18 enters its startup period. During startup, oscillation amplitude builds and becomes unstable from positive feedback (regeneration). This results in very large, nonlinear gain. When the kick off results from an injected RF signal, that signal experiences this same gain as a side effect of the oscillator start up process.

Figure 7A:
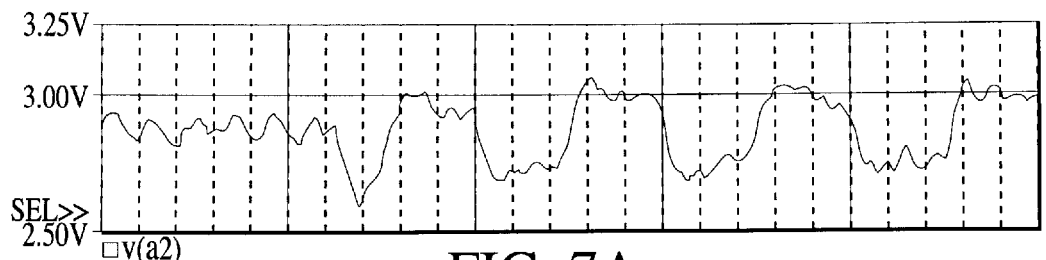
FIG. 7A is a block showing the demodulated data at the output of the AC amplifier shown in FIG. 2.
Figure 7B:
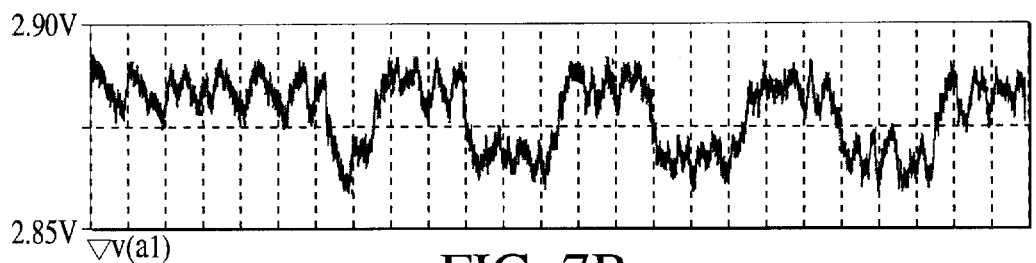
FIG. 7B is a plot showing the output of the difference amplifier illustrated in FIG.2.
Figure 7C:
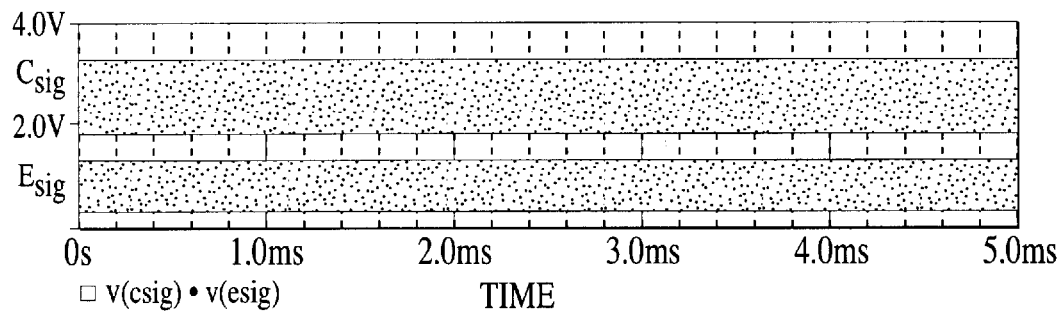
FIG. 7C shows a plot for each of the collector and emitter signals shown at the input of the low pass filter in FIG. 2, with the collector signal being identified at C and the emitter signal identified at E.

The superregenerative oscillator 18 has been drawn in FIG. 1 to show sampling of the collector and emitter signals on lines 22 and 24, respectively. These signals are locked in antiphase, and both respond to RF energy at the receiver operating frequency. The collector and emitter signals are shown in FIGS. 7(*a*), 7(*b*) and 7(*c*) from a simulation of the new differential circuit. It should be noted that with reception of a signal, the collector dc level shifts down and the emitter dc level shifts up. In FIG. 7(*c*) Csig and Esig model the output of the superregenerative oscillator when a carrier of the proper frequency has been received, preferably with 2 kHz modulation. At the collector the quench (noise) is preferably about 600 kHz 1.6 volts peak to peak. At the emitter the quench noise is preferably about 600 kHz 0.9 volts peak to peak. The desired signal preferably is a 1 mv peak to peak 2 kHz square wave that modulates the collector and emitter signals. Because of the large difference in amplitude, the desired signal is not discernable in this plot.

In FIG. 7(*b*), after passing through the common mode passive low pass filters 26, 28, the C and E signals are combined in the difference amplifier 32, and the result is the signal shown. In FIG. 7(*a*), after the gain stage 38, the signal is clearly identifiable as a demodulated OOK signal similar to that shown in FIG. 8.

Figure 9:
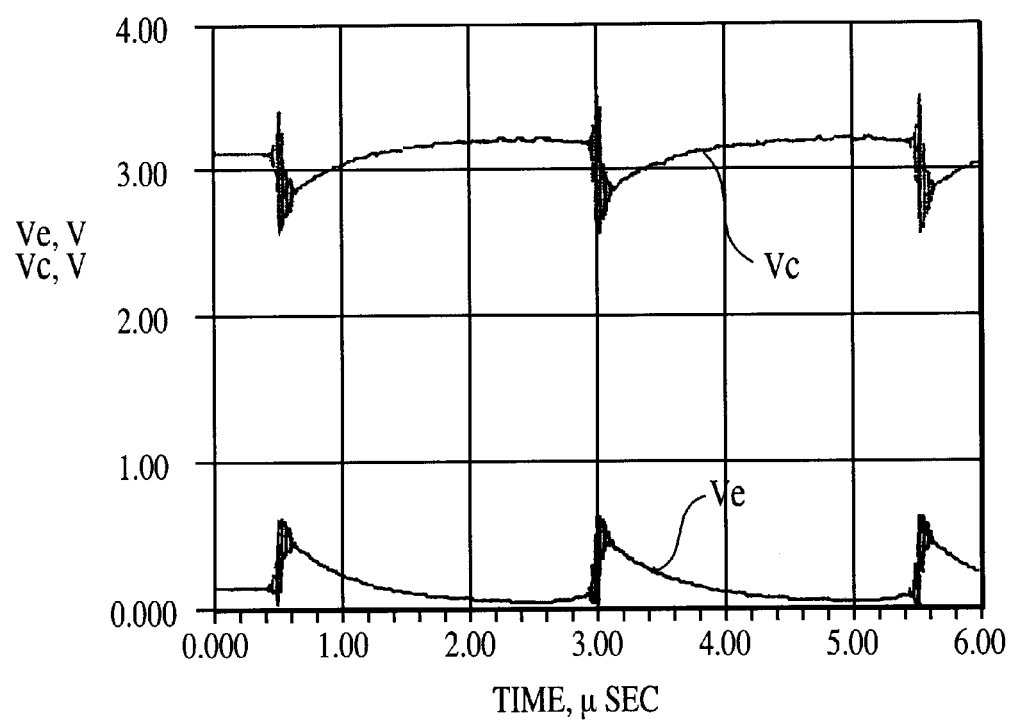

While the collector and emitter signals are generally shown in FIG. 7, FIG. 9 illustrates a more accurate waveform of the output of the differential superregenerative oscillator 18 embodying the present invention. It is important to note that the signals Vc (collector voltage) and Ve (emitter voltage) are locked in anti-phase (180° phase difference), are of approximately equal size, and occur at the quench frequency and appear as noise in the demodulated signal. In the passive low pass filters 26, 28, positive-going current peaks in the emitter and negative-going current peaks in the collector partially combine and cancel. When the emitter and collector signals reach the inputs of the op amp difference amplifier, a significant amount of the residual quench noise has cancelled.

In the preferred embodiment of the present invention shown in FIG. 2, the oscillator 18 is a bipolar transistor based self-quenching superregenerative oscillator with permeability tuning. The bipolar transistor 50 has a collector 52 connected to the input line 20 via a capacitor 54, and to the collector output line 26 via variable inductor 56 and capacitor 58 connected in parallel. It also has an emitter 60 connected to the emitter output line 28 via inductor 62 and the emitter is connected to components 54, 56, 58 and collector 52 via capacitor 64. A transistor base 66 is connected to the emitter output 28 via a quenching capacitor 68 and to a source of self-quenching biasing voltage supplied by +Vdc via resistors 70 and 72 in circuit as shown. The combining of the emitter and collector output signals on lines 26 and 28 is accomplished with a passive low pass filter 30 and op-amp difference amplifier 32. The passive low pass filter 30 uses the common mode rejection of the op-amp to reject quench and residual high frequency components. With proper layout the low pass filter 30 allows symmetric quench frequency voltage components of the emitter and collector signals to cancel. The difference amplifier 32 combines the out-of-phase emitter and collector signals into a single-ended signal on line 40 with improved signal-to-noise ratio.

Figure 6:
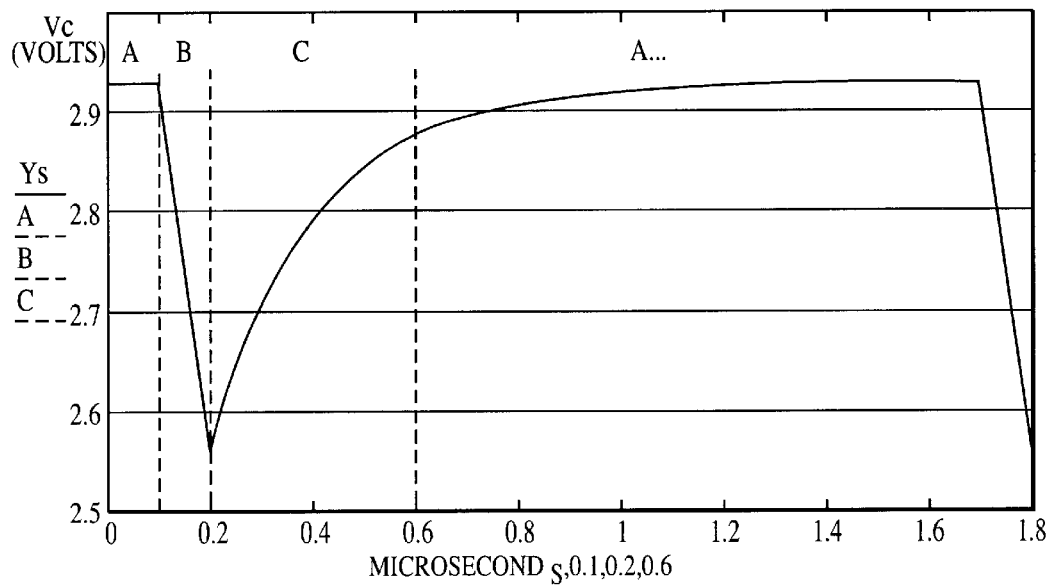
FIG. 6 is a plot illustrating the waveform of the collector of the bipolar transistor shown in FIG. 2.

Quenching is the key to superregenerative demodulation, and referring to FIG. 6, a quench signal as seen at the collector 52 of transistor 50 is shown as an idealized 625 kHz waveform without noise, jitter and UHF oscillations. The timing has been distorted for illustration purposes. The waveform is divided into three phases marked A, B and C. The A phase is OFF and WAITING and occurs from 0 to 100 ns. During this phase, the bias conditions will support gain but oscillations do not occur. UHF oscillations will begin when a voltage of sufficient amplitude arrives. During the B phase the oscillator is ON which occurs from 100 to 200 ns. Throughout the ON period, the quench capacitor 68 charges and the transistor 50 Ve approaches Vb. During the C phase, the oscillator is OFF and RECOVERING, which occurs from 200 to 600 ns. This period begins when Ve comes so close to Vb (base voltage) that the transistor 50 goes into cutoff. Without loop gain, UHF oscillations die out, the quench capacitor 68 begins to discharge, and Ve begins to drop away from Vb. As the quench capacitor discharges, Ve and Vb eventually separate enough to initiate the return of state A, and the cycle repeats.

Figure 8:
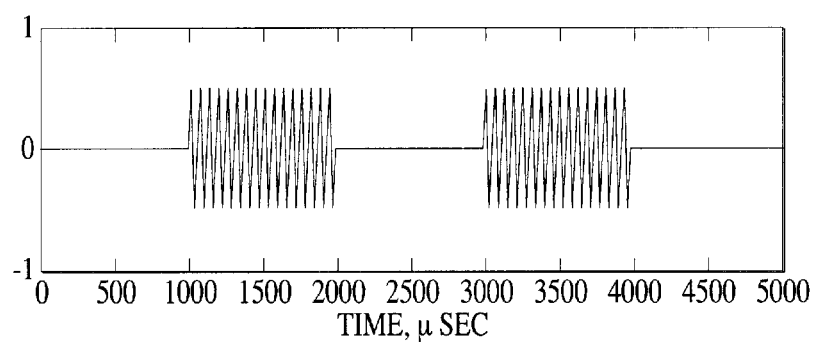
FIG. 8 is a chart illustrating a modulated signal with on-off keying of the type that the receiver of the present invention is designed to detect; and, FIG. 9 is a plot showing the collector and emitter voltages for the present invention shown in FIG. 1.

OOK demodulation is accomplished by low pass filtering the power supply current entering the oscillator. In an OOK RF signal, bursts of RF carrier are separated by periods of no carrier as shown in FIG. 8. The envelope of the modulated signal corresponds to the data stream. Demodulation occurs in the superregenerative oscillator 18 because an input signal on line 20 alters quench operation. When there is no input signal, the duration of the A phase (the OFF and WAITING state) is random and statistically maximized. The kick off voltage comes from noise, which is a random event. States B and C are repeatable and fixed by the circuit implementation, being functions of circuit Q and loop gain. In this condition, the average current entering the oscillator from the power supply is at a minimum. When there is an input signal, the duration of the OFF and WAITING state becomes less random and diminishes with increasing input power. During this state, the input signal replaces random noise as the source of start up energy. Instead of waiting a random interval, the input signal provides the kick-off in a predictable fashion. The oscillator requires more power supply current during its ON period than it does during the OFF periods. The effect of an input signal is to increase the ratio of ON time to OFF time in a given time period. This also increases in the average current the oscillator sinks from the power supply. The result of sampling the average current from the power supply is a direct reconstruction of the original modulating data signal.

Many alternative embodiments are possible because the concept of differential output is not affected by the superregenerative oscillator tuning method or the quench technique. The differential signals are taken from the collector 52 and emitter 60 of the oscillator bipolar junction transistor 50. These waveforms are present and unchanged in nature for all types of superregenerative oscillators including permeability tuned, capacitor tuned, and SAW delay line versions of both internal and external quench designs. A first alternative embodiment is shown in FIG. 3 and this embodiment comprises an externally quenched permeability tuned oscillator. The circuit is very similar to comparable portions of the circuit of FIG. 2, but a separate quench oscillator 80 is provided which has a frequency of approximately 100 kHz and a duty cycle of approximately 5% which operates to turn the oscillator on and off.

There are many different methods of implementing the low pass filter. Examples include a low pass filter section with ground reference as shown in FIG. 4, and active filtering such as with the Sallen and Key design shown in FIG. 5. It should be understood that various digital filtering schemes may alternatively be used, and are considered to be within the scope of the present invention.

From the foregoing, it should be understood that a super-regenerative oscillator RF receiver has been described that has many advantages and desirable attributes. The receiver has a differential output that has the advantage of providing an improved operating range and increased receiver sensitivity without affecting receiver cost or current requirements. Because the receiver has a super-regenerative oscillator from which the demodulated output is taken in differential form, the resulting waveform contains approximately twice the signal content than would be yielded from a singled-ended circuit. The preferred embodiment of present invention can also achieve quench noise cancellation and lower the resulting noise level and further increase the signal-to-noise ratio of the receiver output.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A superregenerative oscillator for use in a superregenerative receiver, comprising:

a bipolar transistor connected in a tunable circuit to provide a demodulated differential output in response to RF energy being applied thereto, said differential output comprising a collector output and an emitter output, with said collector output being of opposite phase relative to said emitter output;

wherein said oscillator is self-quenching and wherein:

said transistor has a collector, base and emitter, with an input being connected to said collector and to said emitter via a capacitor;

said collector being connected to said collector output via a tunable inductor in parallel with a first capacitor;

said emitter being connected to said emitter output via a second inductor and to said collector via a second capacitor;

said base being connected to said emitter output via a second capacitor and to a source of biasing voltage;

said collector output being connected to said emitter output via a third capacitor.

2. A superregenerative oscillator for use in a superregenerative receiver, comprising:

a bipolar transistor connected in a tunable circuit to provide a demodulated differential output in response to RF energy being applied thereto, said differential output comprising a collector output and an emitter output, with said collector output being of opposite phase relative to said emitter output;

said transistor has a collector, base and emitter, with an input being connected to said collector and to said emitter via a capacitor;

said collector being connected to said collector output via a tunable inductor in parallel with a first capacitor;

said emitter being connected to said emitter output via a second inductor, and to said collector via a second capacitor;

said base being connected to a quench oscillator.

3. A superregenerative oscillator as defined in claim 2 wherein said quench oscillator provides a signal having a duty cycle of approximately 5% and a frequency of approximately 100 kHz.

4. A receiver for generating a demodulated output signal for controlling an operating element in response to detecting a transmitted RF signal, comprising:

an input filter for filtering an RF signal applied thereto;

a superregenerative oscillator comprising a bipolar transistor connected in circuit to produce a collector signal and an emitter signal;

a low pass filter connected to said oscillator for canceling symmetrical quench frequency voltage components of said emitter and collector signals;

an amplifier for combining said collector and emitter signals to produce a single-ended output signal; and, a data comparator for demodulating said amplifier output signal and producing a receiver output signal for controlling the operating element.

5. A receiver as defined in claim 4 wherein said low pass filter comprises a cascaded RC low pass filter having common mode reject capability.

6. A receiver as defined in claim 4 wherein said low pass filter comprises an active Sallen-and-key low pass filter.

7. A receiver as defined in claim 4 wherein the operating element comprises an electric motor.

8. A receiver as defined in claim 4 wherein the operating element comprises a solenoid having a member that is moveable in response to the energization of the solenoid.

9. A receiver for generating a demodulated output signal for controlling an operating element in response to detecting a transmitted RF signal, comprising:

an input filter for filtering an RF signal applied thereto;

a superregenerative oscillator comprising a bipolar transistor connected in a tunable circuit to provide a demodulated differential output in response to RF energy being applied thereto, said differential output comprising a collector output and an emitter output, with said collector output being of opposite phase relative to said emitter output;

a low pass filter connected to said oscillator for canceling symmetrical quench frequency voltage components of said emitter and collector outputs;

an amplifier for combining said collector and emitter outputs to produce a single-ended output; and, a data comparator for demodulating said amplifier output and producing a receiver output for controlling the operating element.

10. A receiver as defined in claim 9 wherein said oscillator is self-quenching and wherein:

said transistor has a collector, base and emitter, with an input being connected to said collector and to said emitter via a capacitor;

said collector being connected to said collector output via a tunable inductor in parallel with a first capacitor;

said emitter being connected to said emitter output via a second inductor and to said collector via a second capacitor;

said base being connected to said emitter output via a second capacitor and to a source of biasing voltage;

said collector output being connected to said emitter output via a third capacitor.

11. A receiver as defined in claim 9 wherein said oscillator is externally quenched and wherein:

said transistor has a collector, base and emitter, with an input being connected to said collector and to said emitter via a capacitor;

said collector being connected to said collector output via a tunable inductor in parallel with a first capacitor;

said emitter being connected to said emitter output via a second inductor, and to said collector via a second capacitor;

said base being connected to a quench oscillator.

12. A receiver as defined in claim 9 wherein said low pass filter comprises: first, second and third resistors connected in series between said collector output and a first input of said differential amplifier;

fourth, fifth and sixth resistors connected in series between said emitter output and a second input of said differential amplifier;

a first capacitor connected in parallel between the connection of said first and second resistor and the connection of said fourth and fifth resistors;

a second capacitor connected in parallel between the connection of said second and third resistor and the connection of said fifth and sixth resistors;

a third capacitor connected in parallel between the connection of said third resistor and said first input and the connection of said sixth resistor and said second input.

* * * * *

UNITED STATES PATENT AND TRADEMARK OFFICE
CERTIFICATE OF CORRECTION

PATENT NO. : 6,873,838 B2
DATED : March 29, 2005
INVENTOR(S) : Mapes et al.

It is certified that error appears in the above-identified patent and that said Letters Patent is hereby corrected as shown below:

Drawings,
Fig. 1, the lead line from the COMP box, delete "??" and insert -- 42 --; delete the lead line from the DETECTOR box and "??".

Signed and Sealed this

Sixth Day of December, 2005

JON W. DUDAS
*Director of the United States Patent and Trademark Office*